(12) United States Patent
Wen et al.

(10) Patent No.: US 11,909,306 B2
(45) Date of Patent: Feb. 20, 2024

(54) TRANSIENT COMPENSATION FOR POWER CONVERTER CIRCUITS

(71) Applicant: Apple Inc., Cupertino, CA (US)

(72) Inventors: Yue Wen, Sunnyvale, CA (US); Hubert Attah, Santa Clara, CA (US); Wenxun Huang, Redwood City, CA (US); Hao Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 17/229,470

(22) Filed: Apr. 13, 2021

(65) Prior Publication Data

US 2022/0329147 A1 Oct. 13, 2022

(51) Int. Cl.
*H02M 1/32* (2007.01)
*H02M 1/00* (2006.01)
*H02M 3/158* (2006.01)

(52) U.S. Cl.
CPC ........... *H02M 1/32* (2013.01); *H02M 1/0009* (2021.05); *H02M 3/158* (2013.01)

(58) Field of Classification Search
CPC ....... H02M 1/32; H02M 1/0009; H02M 3/158
See application file for complete search history.

(56) References Cited

U.S. PATENT DOCUMENTS

| 8,519,775 | B2 | 8/2013 | Idgunji et al. |
| 9,712,061 | B1 * | 7/2017 | Newlin .............. H02M 3/1588 |
| 2018/0375438 | A1 | 12/2018 | Shekhar et al. |
| 2020/0073425 | A1 | 3/2020 | Wang et al. |

* cited by examiner

*Primary Examiner* — Rafael O De Leon Domenech
(74) *Attorney, Agent, or Firm* — Kowert, Hood, Munyon, Rankin & Goetzel, P.C.; Dean M. Munyon

(57) ABSTRACT

A power converter circuit included in a computer system regulates a power supply voltage used by other circuits in the computer system. During operation, the power converter circuit monitors the load current, and, in response to a transient in the load current, switches regulation modes to adapt to the new load conditions. Upon a detection of the end of the transient in the load current, the power converter returns to its original regulation mode.

20 Claims, 11 Drawing Sheets

TRANSIENT COMPENSATION FOR POWER CONVERTER CIRCUITS

BACKGROUND

Technical Field

This disclosure relates to power management in computer systems, and, more particularly, to voltage regulator circuit operation.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuit blocks may be designed to operate using different power supply voltage levels. For example, in some computer systems, power management circuits (also referred to as "power management units") may generate and monitor various power supply signals.

Power management circuits often include one or more power converter circuits configured to generate regulator voltage levels on respective power supply signal lines using a voltage level of an input power supply signal. Such converter circuits may employ multiple reactive circuit elements, such as inductors, capacitors, and the like.

SUMMARY OF THE EMBODIMENTS

Various embodiments for generating a voltage level on a regulated power supply node are disclosed. Broadly speaking, a power converter circuit includes a voltage regulator circuit, a detection circuit, and a control circuit. The voltage regulator circuit is configured to a particular voltage level on a regulated power supply node using a first regulation mode. The detection circuit is configured to detect a regulation event using a voltage level of the regulated power supply node. The control circuit is configured, in response to a detection of the regulation event, to change an operating mode of the voltage regulator circuit from the first regulation mode to a second regulation mode. In response to a detection of an end condition for the second regulation mode, the control circuit is further configured to change the operating mode from the second regulation mode to the first regulation mode.

DETAILED DESCRIPTION OF EMBODIMENTS

Figure 1:
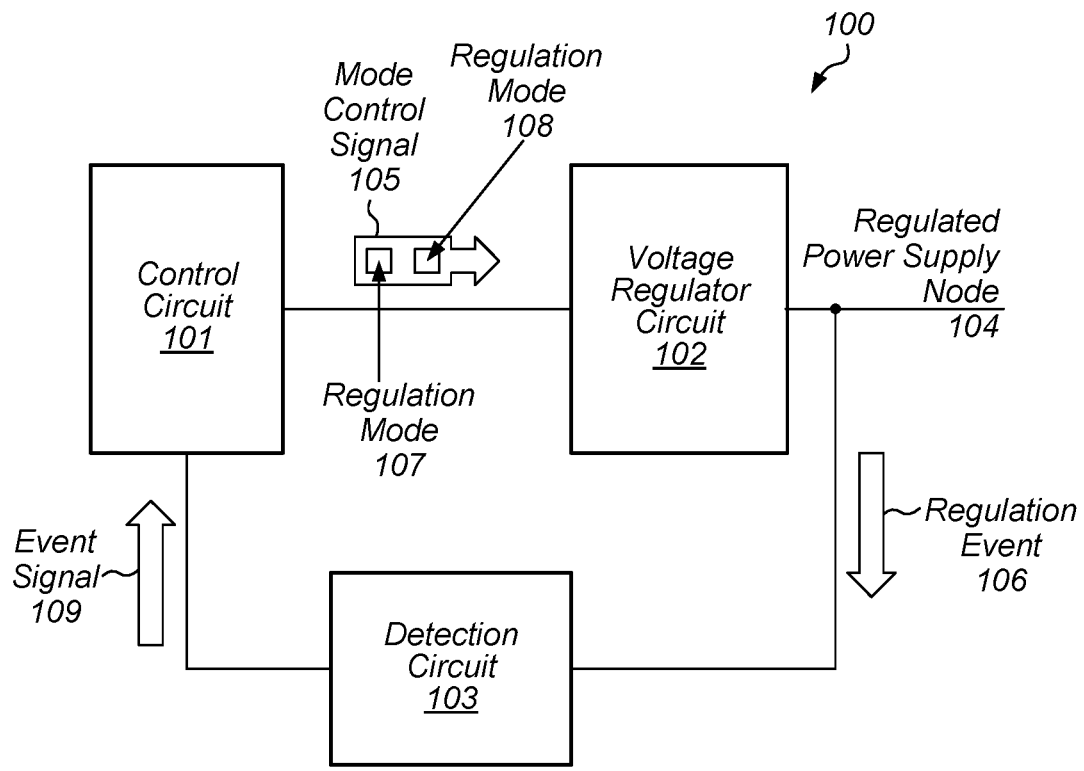
FIG. 1 is a block diagram of an embodiment of a power converter circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node, and is referred to as the "high-side switch." Another switch is coupled between the switch node and a ground supply node, and is referred to as the "low-side switch."

When the high-side switch is closed (referred to as "on-time"), energy is applied to the inductor, resulting in the current through the inductor increasing. During this time, the inductor stores energy in the form of a magnetic field. When the high-side switch is opened and the low-side switch is closed (referred to as "off-time"), energy is no longer being applied to the inductor, and the voltage across the inductor reverses, which results in the inductor functioning as a current source, with the energy stored in the inductor's magnetic field supporting the current flowing into the load. The process of closing and opening the high-side and low-side switches is performed periodically to maintain a desired voltage level on the power supply node.

Power converter circuits may employ different regulation modes to determine periodicity and duration of on-times and off-times. As used herein, a regulation mode refers to a particular method of detecting operating conditions to determine frequencies and durations of on-times and off-times employed by a power converter circuit. For example, a power converter may detect a maximum current flowing through its inductor to determine an end of an on-time period. This type of regulation mode is referred to as a "peak-current regulation mode." Alternatively, a power converter may detect a minimum current flowing through its inductor to determine an end of an off-time period. This type of regulation mode is referred to as a "valley-current regulation mode."

While operating, a power converter circuit may encounter changes in load conditions. For example, an increase in the number of active circuits coupled to the output of the power converter circuit, or an increase in the operating frequency the active circuits can results in an increase in demand for current from the power converter circuit. Alternatively, a decrease in the operating frequency of the active circuits, or some active circuits being placed into a sleep or power-down mode, can result in less demand for current from the power converter circuit. Such changes in the current demand from the power converter circuit can result in transients in the regulated output voltage of the power converter circuit.

Different regulation modes are better suited to different transients in the regulated output voltage of a power converter. For example, if a power converter is operating in a valley-current regulation mode, the on-time period is controlled by a clock signal, and a minimum off-time period is needed before another on-time period can be initiated. When an increase in load current transient is encountered, the minimum off-time period between on-time periods limits the power converter's ability to source energy to the load, thereby prolonging the period for the power converter to adapt to the increased load current. If, however, the power converter was operating in a peak-current regulation mode, a length of the on-time period can be increased to source more energy to the load, thereby shortening the period for the power converter to adapt to the increased load current.

Techniques described in the present disclosure allow for a power converter circuit to switch regulation modes in response to detection of transient events in the output voltage and current of the power converter circuit. By switching regulation modes, a power converter circuit may be able to respond more quickly to the transient events, thereby improving regulation of power supply voltages to circuit blocks.

Turning to FIG. 1, a block diagram of a power converter circuit is depicted. As illustrated, power converter circuit 100 includes control circuit 101, voltage regulator circuit 102, and detection circuit 103.

Voltage regulator circuit 102 is configured to generate a particular voltage level on regulated power supply node 104 using regulation mode 107. As described below, voltage regulator circuit 102 may be implemented as a switching regulator (e.g., a buck regulator circuit), and regulation mode 107 may, in various embodiments, determine a frequency and/or duration of the switching times and a detection criterion for voltage regulator circuit 102.

Detection circuit 103 is configured to detect regulation event 106 using a voltage level of regulated power supply node 104. As described below in more detail, detection circuit 103 may be configured to compare a demand current to a filtered version of the demand current to detect regulation event 106. In response to detecting regulation event 106, detection circuit 103 is configured to generate event signal 109.

Control circuit 101 is configured, in response to a detection of regulation event 106, to change the regulation mode of voltage regulator circuit 102 from regulation mode 107 to regulation mode 108. Control circuit 101 is further configured, in response to a detection of an end of regulation event 106, to change the regulation mode of voltage regulator circuit 102 from regulation mode 108 to regulation mode 107. In various embodiments, to change the regulation mode of voltage regulator circuit 102, control circuit 101 may be further configured to change a value of mode control signal 105, which encodes a current regulation mode for voltage regulator circuit 102. As described below, regulation mode 107 may include a valley-current control mode, and regulation mode 108 may include a peak-current control mode.

Figure 2:
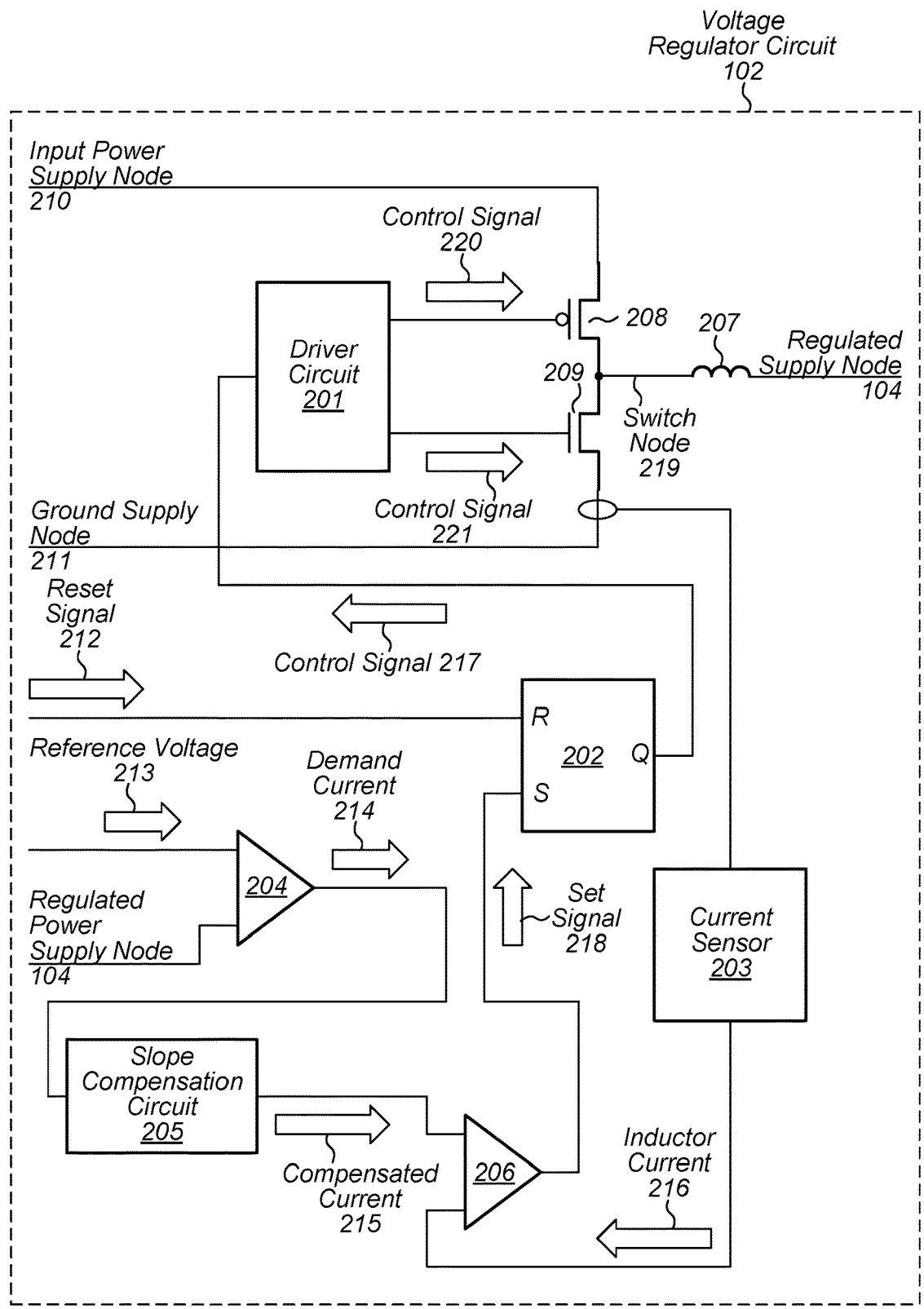
FIG. 2 illustrates a block diagram of a voltage regulator circuit included in a power converter circuit.

Turning to FIG. 2, a block diagram of an embodiment of voltage regulator circuit 102 is depicted. As illustrated, voltage regulator circuit 102 includes driver circuit 201, device 208, device 209, inductor 207, latch circuit 202, error amplifier circuit 204, comparator circuit 206, slope compensation circuit 205, and current sensor circuit 203.

Device 208 is coupled between input power supply node 210 and switch node 219, and is controlled by control signal 220. In a similar fashion, device 209 is coupled between switch node 219 and ground supply node 211, and is controlled by control signal 221. Switch node 219 is further coupled to inductor 207, which is, in turn, coupled to regulated power supply node 104. In various embodiments, inductor 207 may be implemented as a chip inductor coupled to an integrated circuit that includes voltage regulator circuit 102. In other embodiments, inductor 207 may be fabricated as a planar spiral or other suitable structure on the integrated circuit that includes voltage regulator circuit 102.

In response to an activation of control signal 220, device 208 is configured to couple input power supply node 210 to switch node 219, allowing current to flow through inductor 207, thereby magnetizing inductor 207. In response to an activation of control signal 221, device 209 is configured to couple switch node 219 to ground supply node 211. With switch node 219 coupled to ground supply node 211, energy is not longer being supplied to inductor 207, causing the magnetic field of inductor 207 to collapse. As the magnetic field collapses, inductor 207 functions as a current source, providing current to regulated power supply node 104.

In various embodiments, device 208 may be implemented as a p-channel metal-oxide semiconductor field-effect transistor (MOSFET), a Fin field-effect transistor (FinFET), a gate-all-around field-effect transistor (GAAFET), or any other suitable transconductance device. Device 208 may, in some embodiments, be implemented as an n-channel MOSFET, FinFET, GAAFET, or other suitable transconductance device.

Driver circuit 201 is configured to generate control signal 220 and control signal 221 using control signal 217. In various embodiments, driver circuit 201 may be configured, in response to an activation of control signal 217, to activate control signal 220 and deactivate control signal 221. Driver circuit 201 may be further configured, in response to a deactivation of control signal 217, to deactivate control signal 220 and activate control signal 221. In some embodiments, driver circuit 201 may include any suitable combination of logic gates, sequential logic circuit elements, MOSFETs, FinFETs, GAAFETs, or any other suitable transconductance devices.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Latch circuit 202 is configured to deactivate control signal 217 using reset signal 212 and set signal 218. In some embodiments, latch circuit 202 is configured to activate control signal 217 in response to an activation of set signal 218, and deactivate control signal 217 in response to an activation of reset signal 212. In various embodiments, latch circuit 202 may be implemented as a set-reset (SR) latch circuit that includes any suitable combination of logic gates, Current sensor circuit 203 is configured to generate inductor current 216. In various embodiments, current sensor circuit 203 may measure a voltage drop across device 209 and generate inductor current 216 using the measured voltage drop. Current sensor circuit 203 may include any suitable combination of reference and amplifier circuits.

Error amplifier circuit 204 is configured to generate demand current 214 using reference voltage 213 and a voltage level of regulated power supply node 104. In various embodiments, error amplifier circuit 204 may be configured to generate demand current 214 such that a value of demand current 214 is proportional to a difference between reference voltage 213 and the voltage level of regulated power supply node 104.

Slope compensation circuit 205 is configured to generate compensated current 215 using demand current 214. In various embodiments, slope compensation circuit 205 may be configured, in a process referred to as "slope compensation," to combine, a periodic current ramp with demand current 214 to generate compensated current 215. It is noted that slope compensation is used to improve the stability of voltage regulator circuit 102, by increasing a frequency at which the regulator feedback loop can operate, thereby reducing a time for voltage regulator circuit 102 to recover from transients.

Comparator circuit 206 is configured to generate set signal 218 using compensated current 215 and inductor current 216. Comparator circuit 206 may, in some embodiments, be configured to compare compensated current 215 to inductor current 216, and, in response to a determination that compensated current 215 is less than inductor current 216, activate set signal 218. In various embodiments, comparator circuit 206 may be implemented using a differential amplifier circuit, a Schmitt trigger circuit, or any other suitable comparator circuit.

It is noted that although voltage regulator circuit 102 is depicted a single-phase regulator circuit, in other embodiments, voltage regulator circuit 102 may be implemented as a multi-phase regulator circuit. In such cases, inductor 207 may be implemented using multiple inductors, or as coupled inductors that include multiple inductor coils that share a common magnetic core.

Figure 3:
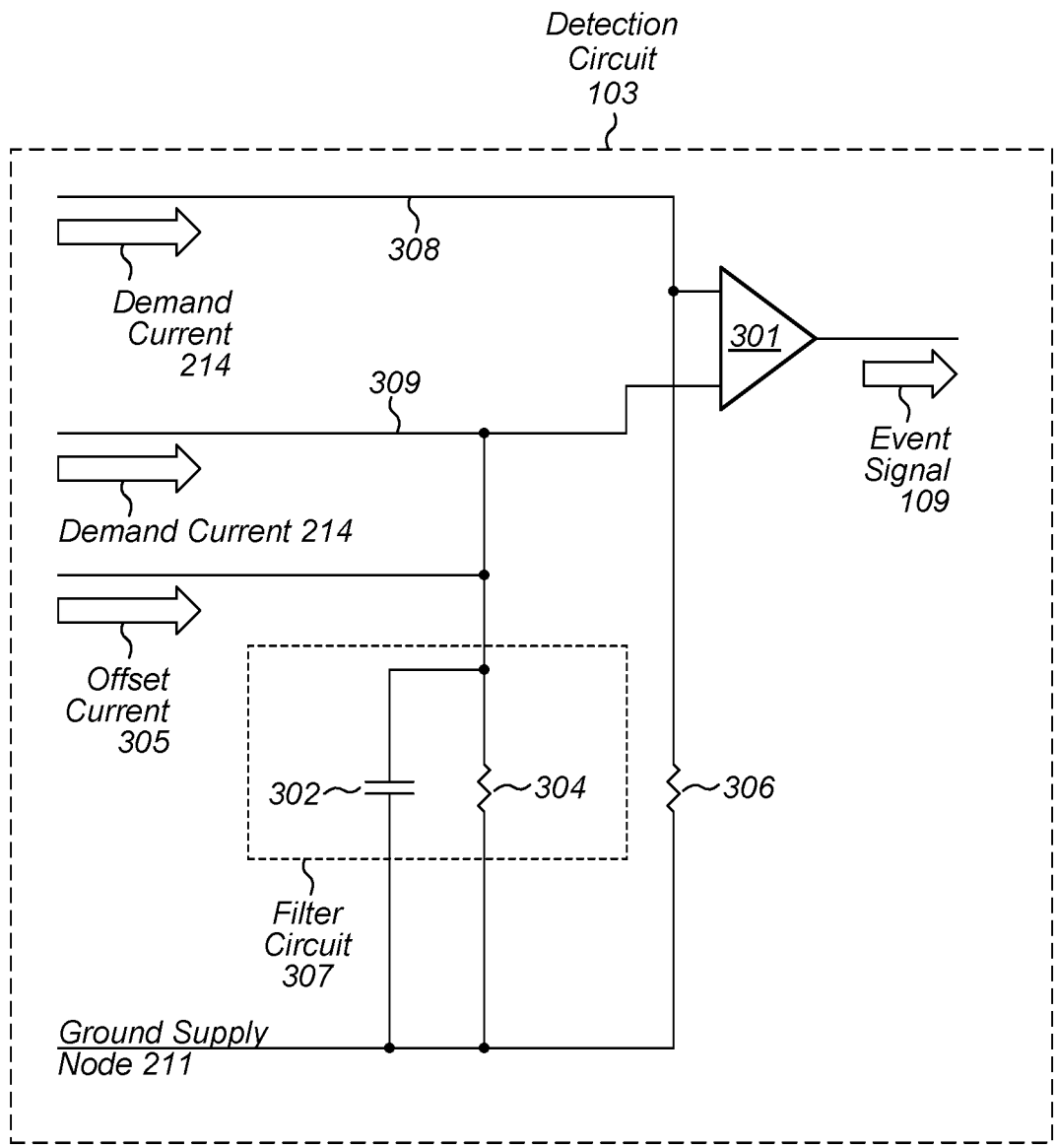
FIG. 3 illustrates a block diagram of an embodiment of a detection circuit.

A block diagram of an embodiment of detection circuit 103 is depicted in FIG. 3. As illustrated, detection circuit 103 includes comparator circuit 301, filter circuit 307, and resistor 306. Filter circuit 307 includes resistor 304 and capacitor 302.

Demand current 214 is injected into nodes 308 and 309, which are coupled to respective inputs of comparator circuit 301. Additionally, offset current 305 is also injected into node 309. Resistor 306 is coupled between node 308 and ground supply node 211. In a similar fashion, filter circuit 307 is coupled between node 309 and ground supply node 211.

As demand current 214 flows into node 308, a voltage drop across resistor 306 is created. In various embodiments, the voltage drop across resistor 306 is proportional to demand current 214. In some cases, a value of resistor 306 may be selected based on the common mode operating point of comparator circuit 301.

Filter circuit 307 is configured to filter a voltage level of node 309 resulting from the injection of demand current 214 and offset current 305. In some embodiments, the time domain response of the voltage level of node 309 may be slowed down by filter circuit 307 relative to the time domain response of node 308. Reducing the response of node 309 in such a fashion, allows the effect of changes in the value of demand current 214 to appear later on node 309 than they will on node 308. By comparing the voltage levels of nodes 308 and 309, changes in demand current 214 can be detected. In various embodiments, the duration of a change in demand current 214 that can be detected may be determined by the response of filter circuit 307.

As illustrated, filter circuit 307 may be implemented as a resistor-capacitor filter circuit using resistor 304 and capacitor 302. In various embodiments, the values of capacitor 302 and resistor 304 may be selected based on durations of transients in demand current 214 to be detected. In some embodiments, capacitor 302 may be implemented as a metal-oxide-metal capacitor, metal-insulator-metal capacitor, or any other suitable capacitor structure available on a semiconductor manufacturing process. Resistors 304 and 306 may, in various embodiments, be implemented as a polysilicon resistor, metal resistor, or any other suitable resistor structures available on a semiconductor manufacturing process. It is noted that in some cases, the value of capacitor 302, and resistors 304 and 306 may be adjustable post manufacture to account for variation in the operation of comparator circuit 301, or to meet different design targets for different end-use applications.

The magnitude of a change in demand current 214 that can be detected may, in some embodiments, be adjusted using offset current 305. Any change in demand current 214 must be greater than a value of offset current 305 before it can be detected. Offset current 305 can be either sourced or sunk from the input of comparator circuit 301. This allows for an adjustment of how large a transient must be in order to be detected. Increasing the value of offset current 305 increases the voltage on the input node of comparator circuit 301, allowing transients with smaller magnitudes to be detectable. The opposite occurs when the value of offset current 305 is decreased. In various embodiments, offset current 305 may be generated using a combination of reference circuits, current mirror circuits, or any other suitable circuits. It is noted that in some cases, the value of offset current 305 may be programmable.

Comparator circuit 301 is configured to generate event signal 109 using demand current 214 and offset current 305. In some embodiments, comparator circuit 301 may be implemented as a differential amplifier circuit, or other suitable amplifier circuit configured to activate event signal 109 based on the result of comparing the respective voltage levels of nodes 308 and 309.

As described above, power converter circuit 100 may be operated in two different regulation modes, with the ability to switch modes during certain regulation events. For example, in some cases, power converter circuit 100 may be operated in valley-current control mode, with the occasional transitions to peak-current control mode in response to high-going transients in the output current. Depending on the base regulation mode, control circuit 101 may be implemented in different fashions. An embodiment of control circuit 101 for use when power converter circuit 100 is operating in a valley-current control mode is depicted. As illustrated, control circuit 101 includes clock gating circuit 401, peak detector circuit 402, and logic circuit 403.

Clock gating circuit 401 is configured to generate gated clock signal 405 using clock signal 404 and event signal 109. In various embodiments, clock gating circuit 401 is configured, in response to a determination that event signal 109 is active, to maintain gate clock signal 405 at a particular logic level for one or more cycles of clock signal 404. Alternatively, clock gating circuit 401 is configured, in response to a determination that event signal 109 is inactive, to transition gated clock signal 405 in response to changes in clock signal 404, such that gate clock signal 405 is a buffered version of clock signal 404. In various embodiments, clock gating circuit 401 may be implemented using any suitable combination of logic gates, complex logic gate, pass gates, and the like.

Peak detector circuit 402 is configured to generate peak signal 406 using an output current. In various embodiments, the output current may correspond to inductor current 216 as depicted in FIG. 2. In various embodiments, peak detector circuit 402 is configured to compare the output current to a peak threshold value to generate peak signal 406. In some cases, in response to a determination that the output current is greater than the peak threshold value, peak detector circuit 402 is configured to activate peak signal 406. It is noted that in some embodiments, the peak threshold value may be programmable.

In various embodiments, peak detector circuit 402 may be implemented as a differential amplifier or other suitable comparator circuit. In some cases, the peak threshold value may be generated within peak detector circuit 402, while in other cases, the peak threshold value may be generated external to peak detector circuit 402. In some cases, peak detector circuit 402 may be active only during periods when event signal 109 is active.

Logic circuit 403 is configured to generate reset signal 212 using gated clock signal 405 and peak signal 406. In various embodiments, to generate reset signal 212, logic circuit 403 is configured to activate reset signal 212 in response to a determination that gated clock signal 405 is active, or in response to a determination that peak signal 406 is active. By activating reset signal 212 using either gated clock signal 405 or peak signal 406, control circuit 101 can control the resetting of latch circuit 202 in different ways for different regulation modes of voltage regulator circuit 102.

Logic circuit 403 is further configured generate control signals 407 using clock signal 404. In various embodiments, control signals 407 are used to limit a duration of time that clock signal 404 is gated. In some cases, logic circuit 403 may be configured to count a number of cycles of clock signal 404 once peak signal 406 becomes active. After a threshold number of cycles of clock signal 404 has been detected, logic circuit 403 may activate particular ones of control signals 407 that disable clock gating circuit 401, preventing event signal 109 from maintaining power converter circuit 100 operating in peak-current regulation mode. It is noted that the number of cycles used by logic circuit 403 may be programmable.

Upon a return to valley-current regulation mode, logic circuit 403 may be further configured to remain in valley-current regulation mode regardless of the state of even signal 109. In various embodiments, logic circuit 403 is configured to activate particular ones of control signals 407, thereby preventing clock gating circuit 401 from responding to an activation of event signal 109. With clock gating circuit 401 unable to respond to the activation of event signal 109, power converter circuit 100 remains in valley-current regulation mode until logic circuit 403 deactivates the particular ones of control signals 407. The duration of which logic circuit 403 keeps the particular ones of control signals 407 active may be determined by a number of cycles of clock signal 404. The number of cycles of clock signal 404 may, in some embodiments, be programmable. By forcing power converter circuit 100 to remain valley-current regulation mode for a period of time after a mode switch has occurred, the chance of power converter circuit 100 oscillating between two regulation modes is reduced.

In various embodiments, logic circuit 403 may be implemented using any suitable combination of logic gates, complex gates, pass gates, and the like. For example, logic circuit 403 may be implemented using a NOR gate and an inverter to perform a logical-OR operation using gated clock signal 405 and peak signal 406.

When the default operating mode of power converter circuit 100 is peak-current control, low-going output current transients can be problematic in maintaining regulation. While operating in peak-current control mode, the off-time of voltage regulator circuit 102 is controlled by a clock signal. Use of the clock signal limits an amount of time that voltage regulator circuit 102 is in off-time where the current in the inductor current is decreasing. By temporarily switching to valley-current control mode, voltage regulator circuit 102 can remain in off-time further reducing the inductor current to help voltage regulator circuit 102 adjust to the new lower load current demand. An embodiment of control circuit 101 for use when power converter circuit 100 is operating in a peak-current control mode is depicted. As illustrated, control circuit 101 includes clock gating circuit 501, valley detector circuit 502, and logic circuit 503.

Clock gating circuit 501 is configured to generate gate clock signal 505 using clock signal 504 and event signal 109. In various embodiments, clock gating circuit 501 is configured, in response to a determination that event signal 109 is active, to maintain gate clock signal 505 at a particular logic level for one or more cycles of clock signal 504. Alternatively, clock gating circuit 501 is configured, in response to a determination that event signal 109 is inactive, to transition gated clock signal 505 in response to changes in clock signal 504, such that gate clock signal 505 is a buffered version of clock signal 504. In various embodiments, clock gating circuit 501 may be implemented using any suitable combination of logic gates, complex logic gate, pass gates, and the like.

Valley detector circuit 502 is configured to generate valley signal 506 using an output current. In various embodiments, the output current may correspond to inductor current 216 as depicted in FIG. 2. Valley detector circuit 502 is configured to compare the output current to a valley threshold value to generate valley signal 506. In some cases, in response to a determination that the output current is less than the valley threshold value, valley detector circuit 502 is configured to activate valley signal 506. It is noted that in some embodiments, the valley threshold value may be programmable.

In various embodiments, valley detector circuit 502 may be implemented as a differential amplifier or other suitable comparator circuit. In some cases, the threshold value may be generated within valley detector circuit 502, while in other cases, the threshold value may be generated external to valley detector circuit 502. In some cases, valley detector circuit 502 may be active only during periods when event signal 109 is active.

Logic circuit 503 is configured to generate reset signal 212 using gated clock signal 505 and valley signal 506. In various embodiments, to generate reset signal 212, logic circuit 503 is configured to activate reset signal 212 in response to a determination that gated clock signal 505 is active, or in response to a determination that valley signal 506 is active. By activating reset signal 212 using either gated clock signal 505 or valley signal 506, control circuit 101 can control the resetting of latch circuit 202 in different ways for different regulation modes of voltage regulator circuit 102.

Logic circuit 503 is further configured generate control signals 507 using clock signal 504. In various embodiments, control signals 507 are used to limit a duration of time that clock signal 504 is gated. In some cases, logic circuit 503 may be configured to count a number of cycles of clock signal 504 once valley signal 506 becomes active. After a threshold number of cycles of clock signal 504 has been detected, logic circuit 503 may activate particular ones of control signals 507 that disable clock gating circuit 501, preventing event signal 109 from maintaining power converter circuit 100 operating in valley-current regulation mode. It is noted that the number of cycles used by logic circuit 503 may be programmable.

Upon a return to peak-current regulation mode, logic circuit 503 may be further configured to remain in peak-current regulation mode regardless of the state of even signal 109. In various embodiments, logic circuit 503 is configured to activate particular ones of control signals 507, thereby preventing clock gating circuit 501 from responding to an activation of event signal 109. With clock gating circuit 501 unable to respond to the activation of event signal 109, power converter circuit 100 remains in peak-current regulation mode until logic circuit 503 deactivates the particular ones of control signals 507. The duration of which logic circuit 503 keeps the particular ones of control signals 507 active may be determined by a number of cycles of clock signal 504. The number of cycles of clock signal 504 may, in some embodiments, be programmable. By forcing power converter circuit 100 to remain peak-current regulation mode for a period of time after a mode switch has occurred, the chance of power converter circuit 100 oscillating between two regulation modes is reduced.

In various embodiments, logic circuit 503 may be implemented using any suitable combination of logic gates, complex gates, pass gates, and the like. For example, logic circuit 503 may be implemented using a NOR gate and an inverter to perform a logical-OR operation using gated clock signal 505 and valley signal 506.

Figure 4:
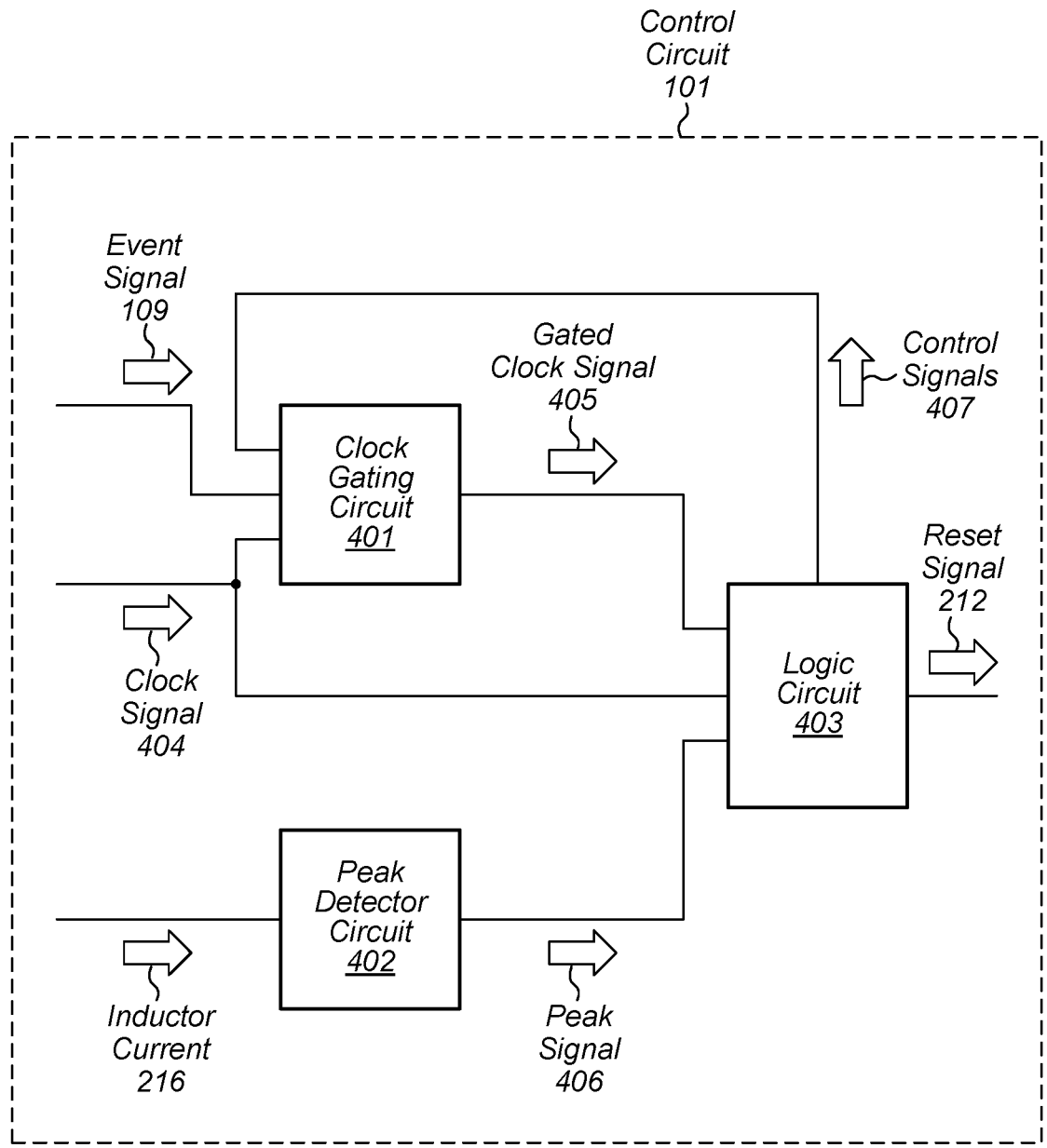
FIG. 4 illustrates a block diagram of an embodiment of a control circuit for a power converter circuit.
Figure 5:
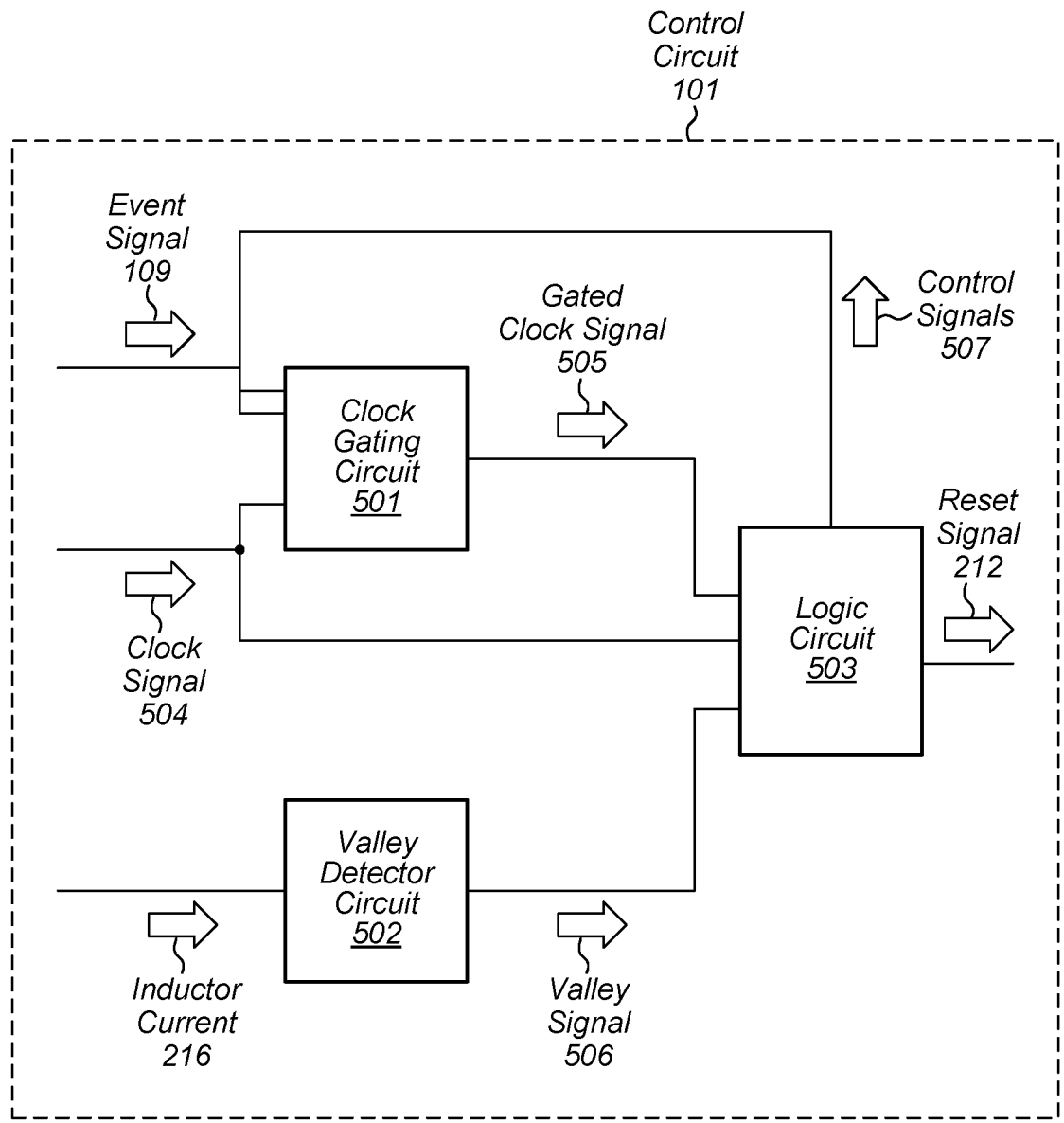
FIG. 5 illustrates a block diagram of another embodiment of a control circuit for a power converter circuit.

It is noted that in some embodiments, portions of the embodiments depicted in FIGS. 4 and 5 may be combined to generate a composite control circuit. Such a composite control circuit could allow for power converter circuit 100 to respond to either high-going or low-going output current transients by switching from valley-current control mode to peak-current control mode or vice versa.

Figure 6A:
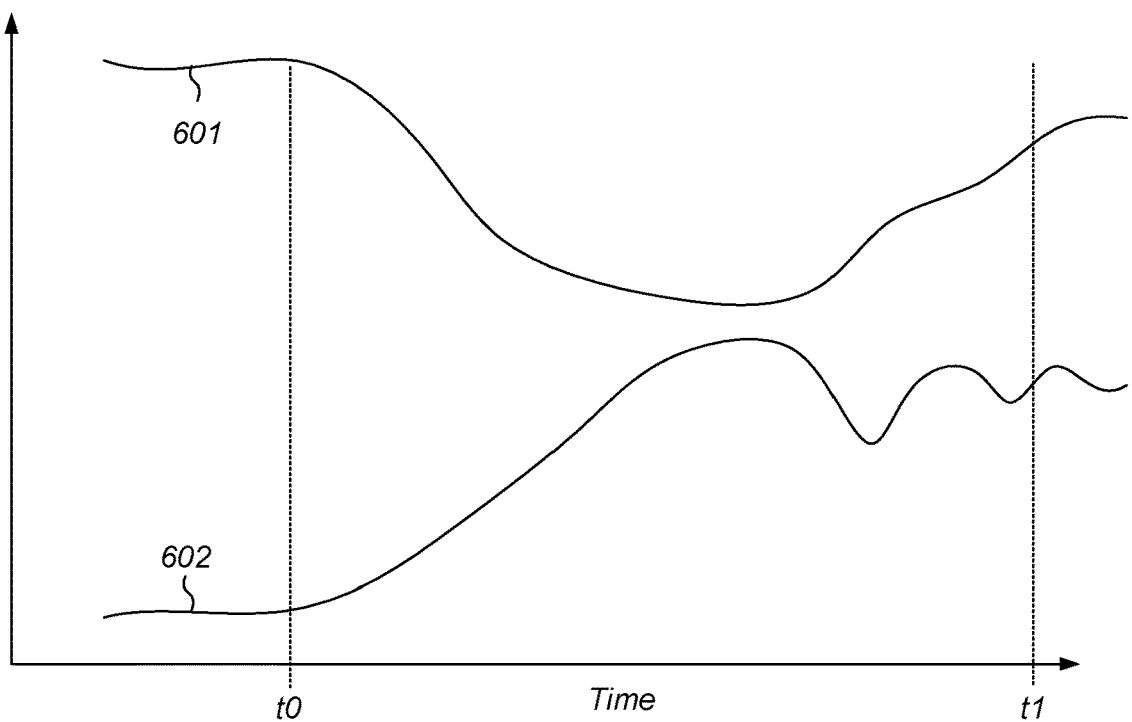
FIG. 6A illustrates waveforms depicting a high-going load current transient.

As mentioned above, a regulation event can include multiple types of events. Waveforms illustrating a high-going output current transient are depicted in FIG. 6A. As illustrated, waveform 601 corresponds to a voltage level of regulated power supply node 104, while waveform 602 corresponds to an output current of voltage regulator circuit 102.

At time t0 a regulation event (e.g., regulation event 106) occurs. In the illustrated waveforms, the regulation event is an increase in the output current of voltage regulator circuit 102. As mentioned above, the increase in the output current may be the result of additional circuits coupled to regulation power supply node 104 becoming active, increasing the current drawn from voltage regulator circuit 102. Alternatively, the increase in output current may be the result of an increase in the operating frequency of circuits coupled to regulation power supply node 104.

As the demand for current from voltage regulator circuit 102 increases, a voltage on regulated power supply node 104 begins decrease (as shown in waveform 601). The drop in the voltage level of regulated power supply node 104 is a result of current on-time values for voltage regulator circuit 102 not being adequate to source sufficient energy to the load. As voltage regulator circuit 102 compensates for the increased current demand, the voltage level of regulated power supply node 104 increases to return to a level similar to that prior to the regulation event happening at time t1. As noted above, voltage regulator circuit 102 may switch regulations modes as it adjusts to the increased current demand.

Figure 6B:
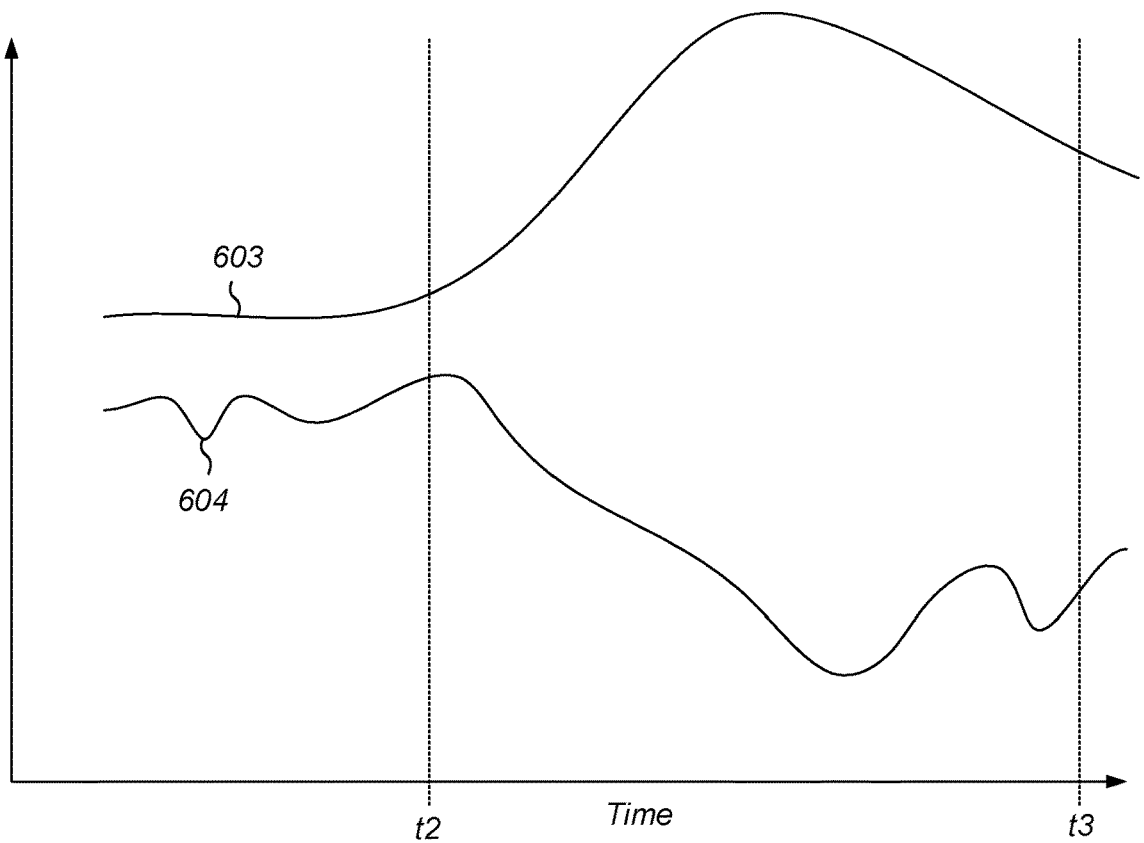
FIG. 6B illustrates waveforms depicting a low-going load current transient.

Turning to FIG. 6B, waveforms associated with voltage regulator circuit 102 during a low-going current transient are depicted. As illustrated, waveform 603 corresponds to a voltage level of regulated power supply node 104, and waveform 604 corresponds to an output current of voltage regulator circuit 102.

At time t2, a regulation event (e.g., regulation event 106) occurs. In the illustrated waveforms, the regulation event is a decrease in the output current of voltage regulator circuit 102. As mentioned above, the decrease in the output current of voltage regulator circuit 102 may be a result of active circuits coupled to regulated power supply node 104 entering a sleep or power down mode. Alternatively, the decrease in output current may be the result of a decrease in the operating frequency of circuits coupled to regulation power supply node 104.

As the demand for current from voltage regulator circuit 102 decreases, the voltage on regulated power supply node 104 begins to increase (as shown in waveform 603). The increase in the voltage level of regulated power supply node 104 is a result of current on-time values for voltage regulator circuit 102 being too aggressive, resulting in too much energy being sourced to the load. As voltage regulator circuit 102 compensates for the increased current demand, the voltage level of regulated power supply node 104 decreases to return to a level similar to that prior to the regulation event happening at time t3. As noted above, voltage regulator circuit 102 may switch regulation modes as it adjusts to the increased current demand.

Figure 7:
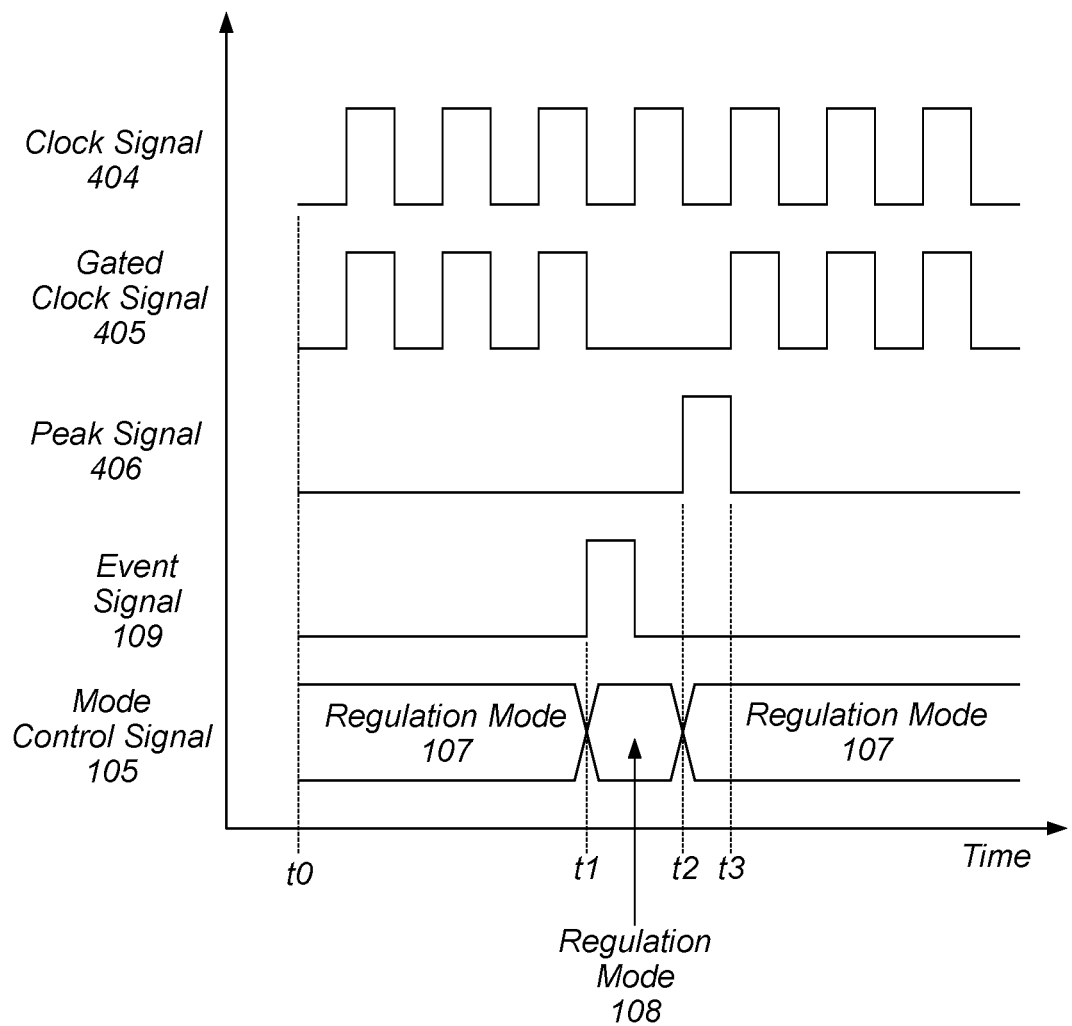
FIG. 7 illustrates waveforms associated with the operation of a power converter circuit during a regulation event.

Turning to FIG. 7, example waveforms associated with the operation of control circuit 101 as described above in FIG. 4 and FIG. 5 are illustrated. It is noted that the waveforms depicted in FIG. 7 are merely examples and, in other embodiments, the waveforms may have different shapes and different relative timings.

From time t0 to time t1, a value of mode control signal 105 is indicative of regulation mode 107. As noted above, mode 701 may be either a peak-current regulation mode or a valley-current regulation mode. During this time, gated clock signal 405 is tracking clock signal 404. In various embodiments, gated clock signal 405 may be a buffered version of clock signal 404.

At time t1, regulation event 106 is detected, and event signal 109 is activated. It is noted that the timing of the activation of event signal 109 is an example. In other embodiments, event signal 109 may be activated at any time during a period of clock signal 404. As described above, event signal 109 can be activated based on a variety of criteria, and its duration may be based on the same variety of criteria.

In response to the activation of event signal 109, mode control signal 105 changes value from indicating regulation mode 107 to indicating regulation mode 108. As noted above, regulation mode 108 is different than regulation mode 107. For example, if regulation mode 107 is a peak-current regulation mode, then regulation mode 108 may be a valley-current regulation mode, or vice versa. Also, at time t1, gated clock signal 405 is set to a low logic level. Although the waveforms in FIG. 7 depict gated clock signal 405 as being set to a low logic level, in other embodiments, gate clock signal may be set to a high logic level. Provided that gate clock signal 405 stops changing state in response to the activation of event signal 109, either logic state can be employed.

At time t2, peak signal 406 is activated. As described above, peak signal 406 may be activated in response to peak detector circuit 402 detecting a peak in inductor current 216. It is noted that peak signal 406 is activated in response to regulation mode 108 corresponding to a peak-current regulation mode. In other embodiments, valley signal 506 may be activated in a similar fashion in response to regulation mode 108 corresponding to a valley-current regulation mode.

Also, at time t2, mode control signal 105 transitions from a value indicative of regulation mode 108 to a value indicative of regulation mode 107. Moreover, once peak signal 406 has been activated, gated clock signal 405 will resume transitioning at time t3. It is noted that although peak signal 406 is shown deactivating at time t3, in other embodiments, peak signal 406 may deactivate as soon as inductor current 216 begins to decrease from the previously detected peak value.

Figure 8:
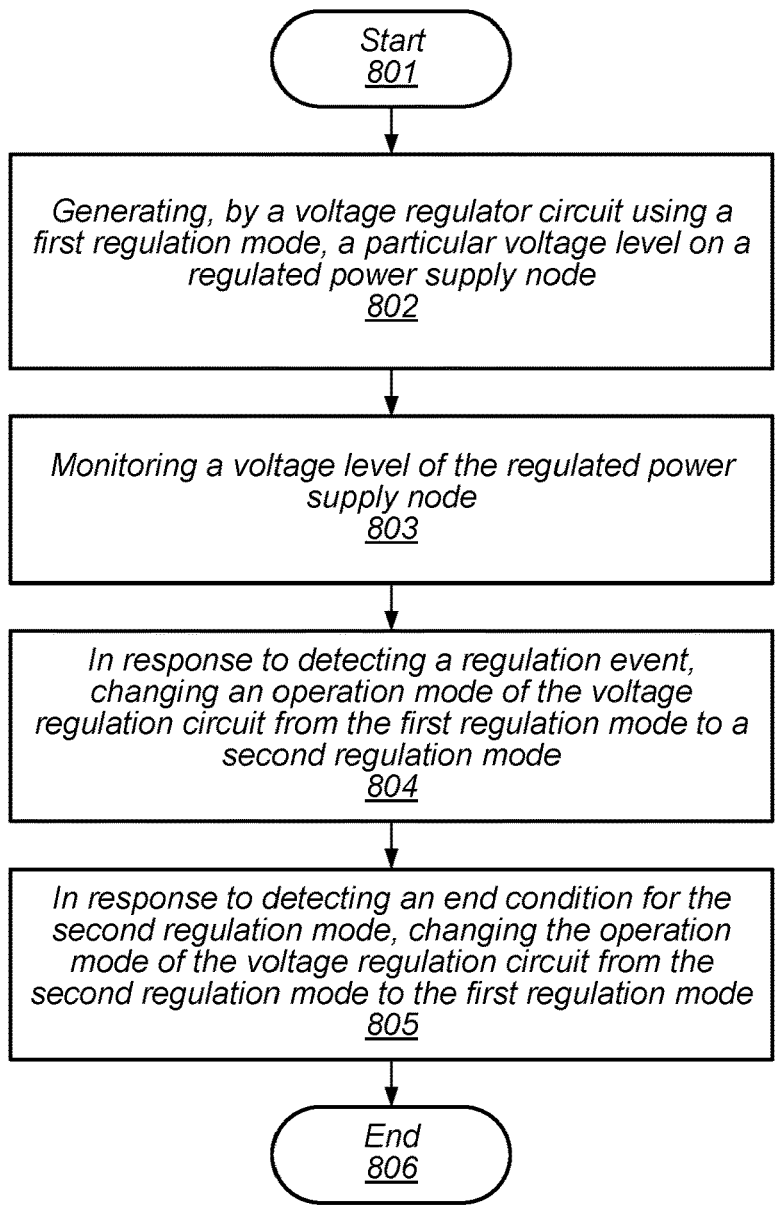
FIG. 8 illustrates a flow diagram depicting an embodiment of another method for operating a power converter circuit.

Turning to FIG. 8, a flow diagram depicting an embodiment of a method for operating a power converter circuit is illustrated. The method, which may be applied to power converter circuit 100, begins in block 801.

The method includes generating, by a voltage regulator circuit using a first regulation mode, a particular voltage level on a regulated power supply node (block 802). In various embodiments, the first regulation mode includes a valley-current regulation mode and the second regulation mode includes a peak-current regulation mode. In other embodiments, the first regulation mode includes a peak-current regulation mode and the second regulation mode includes a valley-current regulation mode.

The method further includes monitoring a voltage level of the regulated power supply node (block 803). In some embodiments, monitoring the voltage level of the regulated power supply includes generating a demand current using the voltage level of the regulated power supply node and a reference voltage level, and comparing the demand current and a filtered version of the demand current. The method may also include combining the demand current and an offset current to generate a combined current, and filtering the combined current to generate a filtered version of the demand current.

The method also includes, in response to detecting a regulation event, changing an operation mode of the voltage regulation circuit from the first regulation mode to a second regulation mode (block 804). In some embodiments, the regulation event includes a change in a load current that exceeds a threshold value within a particular period.

The method further includes, in response to detecting an end condition for the second regulation mode, changing the operation mode of the voltage regulation circuit from the second regulation mode to the first regulation mode (block 805). In some embodiments, the method may include comparing an output current of the voltage regulator circuit to a threshold value to detect the end condition for the second regulation mode. The method concludes in block 806.

Figure 9:
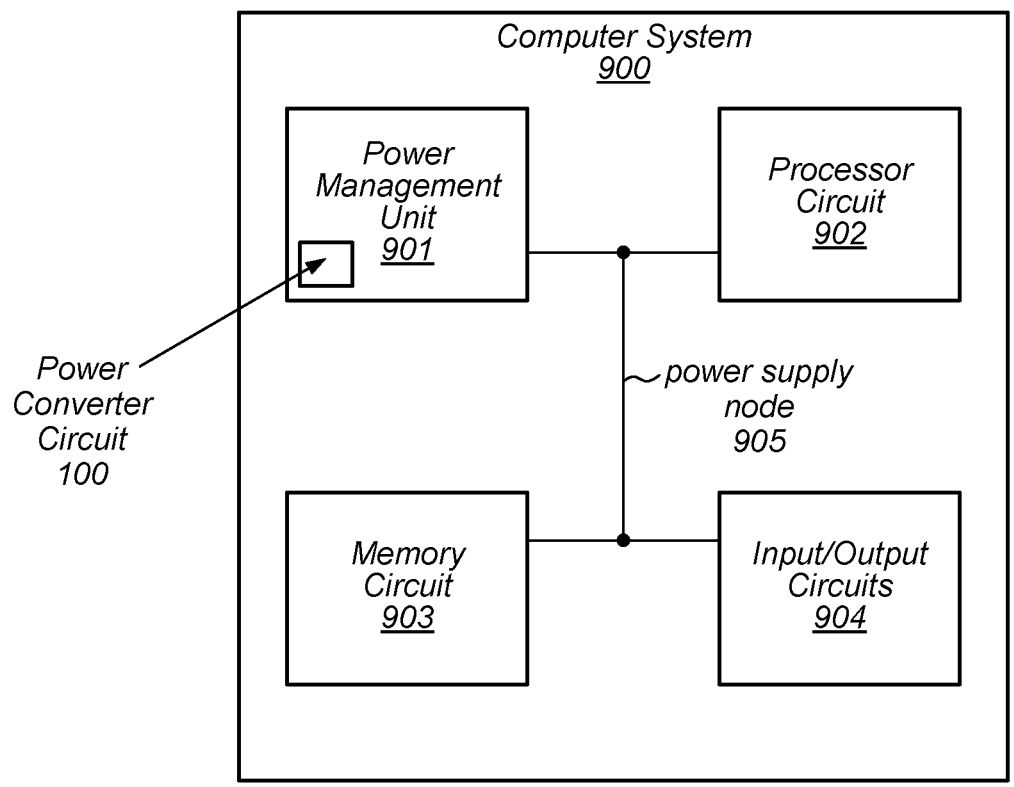
FIG. 9 is a block diagram of a system-on-a-chip.

A block diagram of a system-on-a-chip (SoC) is illustrated in FIG. 9. In the illustrated embodiment, SoC 900 includes power management unit 901, processor circuit 902, memory circuit 903, and input/output circuits 904, each of which is coupled to power supply node 905. In various embodiments, SoC 900 may be configured for use in a desktop computer, server, or in a mobile computing application such as, e.g., a tablet, laptop computer, or wearable computing device.

Power management unit 901 includes power converter circuit 100 which is configured to generate a regulated voltage level on power supply node 905 in order to provide power to processor circuit 902, input/output circuits 904, and memory circuit 903. Although power management unit 901 is depicted as including a single power converter circuit, in other embodiments, any suitable number of power converter circuits may be included in power management unit 901, each configured to generate a regulated voltage level on a respective one of multiple power supply nodes included in SoC 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 9, in other embodiments, any suitable number of memory circuits may be employed.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Figure 10:
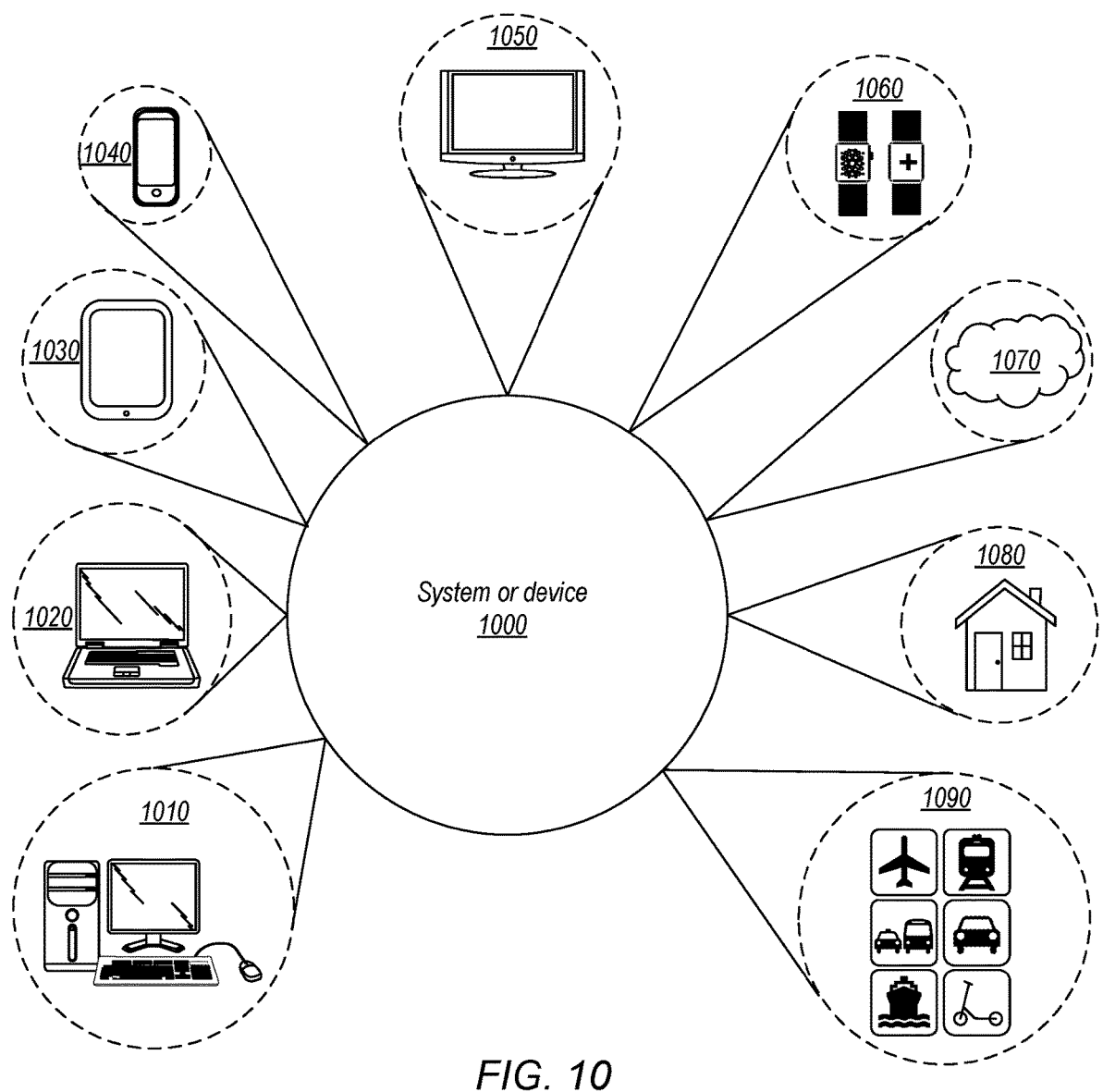
FIG. 10 is a block diagram of an embodiment of a system.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
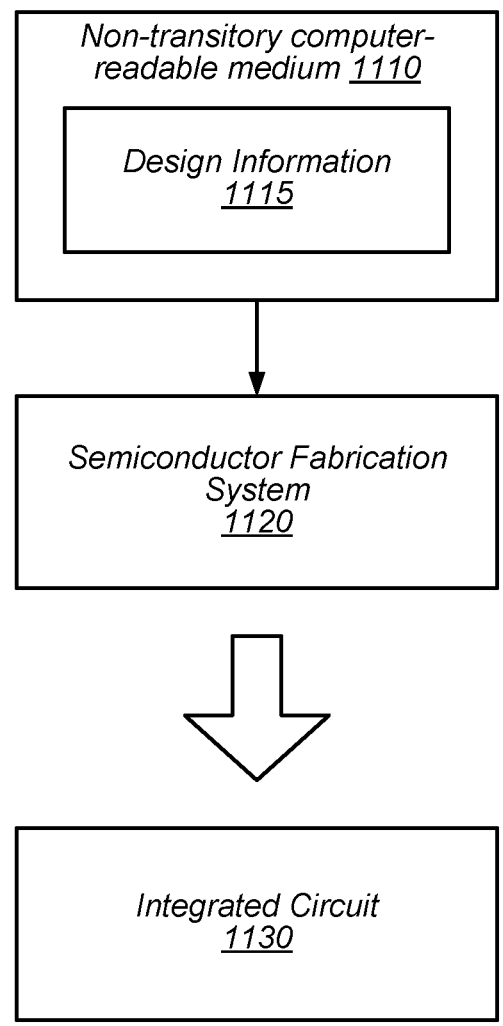
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a voltage regulator circuit configured to generate a particular voltage level on a regulated power supply node using a first regulation mode;
   a detection circuit configured to detect a regulation event using a voltage level of the regulated power supply node; and
   a control circuit configured to:
      in response to a detection of the regulation event, change an operating mode of the voltage regulator circuit from the first regulation mode to a second regulation mode; and,
      in response to a detection of an end condition for the second regulation mode, change the operating mode from the second regulation mode to the first regulation mode;
      wherein one of the first and second regulation modes includes a valley-current regulation mode, and wherein another one of the first and second regulation modes includes a peak-current regulation mode.

2. The apparatus of claim 1, wherein the control circuit is further configured to detect a change in a demand current for the voltage regulator circuit that exceeds a threshold value within a particular period of time.

3. The apparatus of claim 2, wherein to detect the change in the demand current, the control circuit is further configured to:
generate the demand current using the voltage level of the regulated power supply node and a reference voltage level; and
compare the demand current to a filtered version of the demand current.

4. The apparatus of claim 3, wherein the control circuit is further configured to generate the filtered version of the demand current using the demand current and an offset current.

5. The apparatus of claim 1, further comprising a peak detector circuit configured to:
perform a comparison of an output current supplied to a load circuit to a peak threshold value; and
generate a peak signal in response to a determination that the output current is greater than the peak threshold value; and
a logic circuit configured to generate a reset signal using a gated clock signal and the peak signal, the reset signal indicating detection of an end condition for the second regulation mode.

6. The apparatus of claim 1, further comprising a valley detector circuit configured to:
compare an output current supplied to a load circuit to a valley threshold value; and
generate a valley signal in response to a determination that the output current is less than the valley threshold value; and
a logic circuit configured to generate the a signal using a gated clock signal and the valley signal, the reset signal indicating detection of an end condition for the second regulation mode.

7. A method, comprising:
generating, by a voltage regulation circuit using a first regulation mode, a particular voltage level on a regulated power supply node;
monitoring a voltage level of the regulated power supply node;
in response to detecting a regulation event, changing an operating mode of the voltage regulation circuit from the first regulation mode to a second regulation mode; and
in response to detecting an end condition for the second regulation mode, changing the operating mode of the voltage regulation circuit from the second regulation mode to the first regulation mode;
wherein one of the first and second regulation modes includes a valley-current regulation mode, and wherein another one of the first and second regulation modes includes a Peak-current regulation mode.

8. The method of claim 7, wherein the first regulation mode includes a valley-current regulation mode and the second regulation mode includes a peak-current regulation mode.

9. The method of claim 8, further comprising comparing an output current of the voltage regulation circuit to a threshold value to detect the end condition for the second regulation mode.

10. The method of claim 7, wherein the first regulation mode includes a peak-current regulation mode and the second regulation mode includes a valley-current regulation mode.

11. The method of claim 7, wherein the regulation event includes a change in a load current that exceeds a threshold value within a particular period of time.

12. The method of claim 7, wherein monitoring the voltage level of the regulated power supply node includes:
generating a demand current using the voltage level of the regulated power supply node and a reference voltage level; and
comparing the demand current and a filtered version of the demand current.

13. The method of claim 12, further comprising:
combining the demand current and an offset current to generate a combined current; and
filtering the combined current to generate the filtered version of the demand current.

14. An apparatus, comprising:
a load circuit coupled to a regulated power supply node; and
a power converter circuit configured to:
generate, using a first regulation mode, a particular voltage level on the regulated power supply node;
monitor a voltage level of the regulated power supply node;
generate an event signal in response to a detection of a regulation event;
change, using the event signal, an operating mode from the first regulation mode to a second regulation mode;
generate a reset signal in response to a detection of an end condition for the second regulation mode; and
change, using the reset signal, the operating mode from the second regulation mode to the first regulation mode;
wherein one of the first and second regulation modes includes a valley-current regulation mode, and wherein another one of the first and second regulation modes includes a Peak-current regulation mode.

15. The apparatus of claim 14, wherein the first regulation mode includes a valley-current regulation mode and the second regulation mode includes a peak-current regulation mode, and wherein the power converter circuit includes:
a clock gating circuit configured to generate a gated clock signal using an input clock signal and the event signal;
a valley detector circuit configured to:
compare an output current supplied to the load circuit to a valley threshold value; and
generate a valley signal in response to a determination that the output current is less than the valley threshold value; and
a logic circuit configured to generate the reset signal using the gated clock signal and the valley signal.

16. The apparatus of claim 14, wherein the first regulation mode includes a peak-current regulation mode and the second regulation mode includes a valley-current regulation mode, and wherein the power converter circuit includes:
a clock gating circuit configured to generate a gated clock signal using an input clock signal and the event signal
a peak detector circuit configured to:
perform a comparison of an output current supplied to the load circuit to a peak threshold value; and
generate a peak signal in response to a determination that the output current is greater than the peak threshold value; and
a logic circuit configured to generate the reset signal using the gated clock signal and the peak signal.

17. The apparatus of claim 16, wherein the logic circuit is further configured to:
count a number of cycles of the input clock signal in response to an activation of the peak signal; and
in response to a determination that the number of cycles has reached a threshold value, disable the clock gating circuit.

18. The apparatus of claim 14, wherein to monitor the voltage level of the regulated power supply node, the power converter circuit is further configured to:
   generate a demand current using the voltage level of the regulated power supply node and a reference voltage level; and
   compare the demand current and a filtered version of the demand current.

19. The apparatus of claim 18, wherein the power converter circuit is further configured to:
   combine the demand current and an offset current to generate a combined current; and
   filter the combined current to generated the filtered version of the demand current.

20. The apparatus of claim 14, wherein the regulation event includes a change in a load current of the power converter circuit that exceeds a threshold value within a particular period of time.

* * * * *